United States Patent [19]

Takatori et al.

[11] Patent Number: 5,394,510
[45] Date of Patent: * Feb. 28, 1995

[54] NEURAL NETWORK-TYPE DATA PROCESSING SYSTEM RECOGNIZING A PREDETERMINED SHAPE USING INHIBITORY CONNECTIONS

[75] Inventors: Sunao Takatori; Ryohei Kumagai; Koji Matsumoto; Makoto Yamamoto, all of Tokyo, Japan

[73] Assignee: Yozan Inc., Tokyo, Japan

[*] Notice: The portion of the term of this patent subsequent to Nov. 2, 2010 has been disclaimed.

[21] Appl. No.: 77,393

[22] Filed: Jun. 17, 1993

Related U.S. Application Data

[63] Continuation of Ser. No. 884,227, May 11, 1992, Pat. No. 5,259,065, which is a continuation of Ser. No. 610,113, Nov. 7, 1990, abandoned.

[30] Foreign Application Priority Data

Nov. 16, 1989 [JP] Japan .................... 1-297951

[51] Int. Cl.$^6$ .............................. G06F 15/18
[52] U.S. Cl. .......................... 395/22; 395/21
[58] Field of Search ............ 395/21, 22, 24; 382/14

[56] References Cited

PUBLICATIONS

Tenario, Manoel F. and Hughes, Craig S., "Real Time Noisy Image Segmentation Using An Artificial Neural Network Model", IEEE, First International Conference on Neural Networks, San Diego, Calif., Jun. 21–24, 1987, vol. IV, pp. 357–363.
Kohonen, T., "An Introduction to Neural Computing", Neural Netwrks vol. 1, 1988, pp. 3–16.
Lippmann, R. P., "An Introduction to Computing with Neural Nets", IEEE ASSP Magazine, Apr. 1987, pp. 4–21.
Simpson, P. K., "Artificial Neural Systems", Pergamon Press, 1990, pp. 85–90.
Caudill, M., "Neural Networks Primes Part IV", AI Expert, Aug. 1988, pp. 61–67.
Moopenn et al., "Error Correction and Asymmetry in a Binary Memory Matrix", American Institute of Physics Conf. Proc., 1986, 315–320.
Kohonen et al., "Representation of Sensory Information in Self–Organizing Feature Maps", American Institute of Physics Conf. Proc., 1986, 271–276.
Kohonen, T. "Self–Organization and Associative Memory", Springer–Verlag, 1988, 185–209.
Fukushuma, K., "Neocognitron: A hierarchical Network for Visual Pattern Recognition", Fuzzy Computing, 1988, 53–69.

*Primary Examiner*—Robert W. Downs
*Attorney, Agent, or Firm*—Cushman, Darby & Cushman

[57] ABSTRACT

A data processing system of the neural network type. The system recognizes a predetermined shape by providing some connections that are inhibitory between a plurality of neurons in a neural layer of the neural network. If data is found in the inhibitory area, it makes it harder for the neurons in the correct area to fire. Only when the neurons in the correct area fire is the predetermined shape recognized.

12 Claims, 4 Drawing Sheets

FIG. 7
FIG. 8
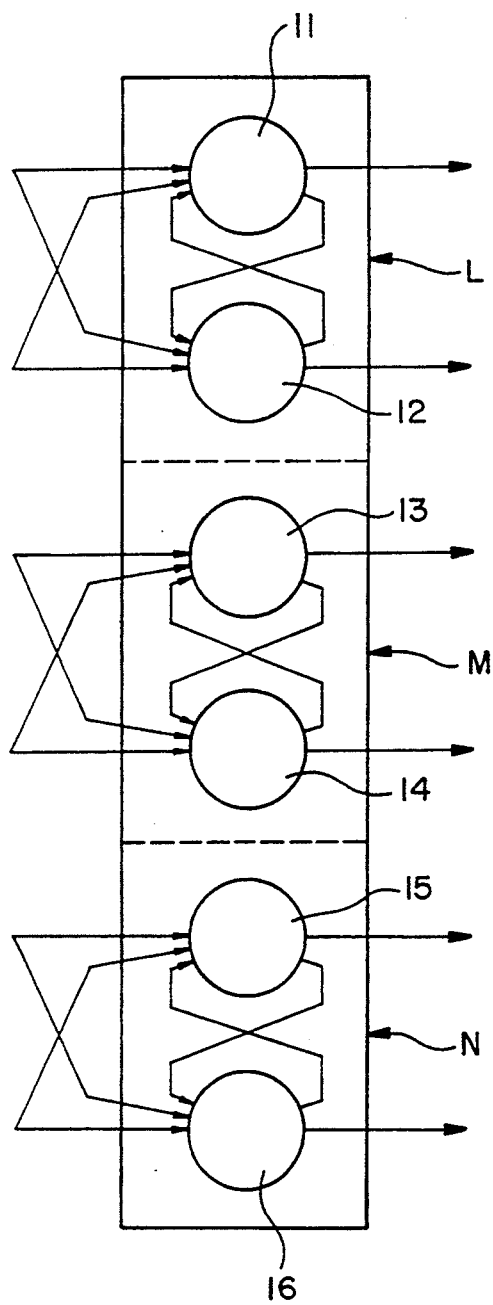
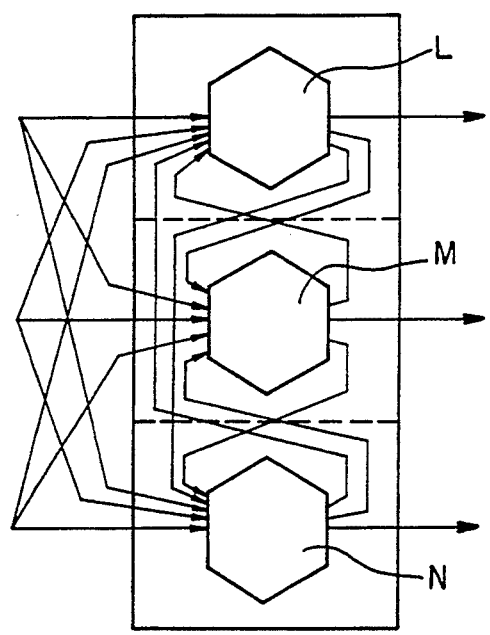

NEURAL NETWORK-TYPE DATA PROCESSING SYSTEM RECOGNIZING A PREDETERMINED SHAPE USING INHIBITORY CONNECTIONS

This is a continuation of application Ser. No. 07/884,227, filed May 11, 1992, now U.S. Pat. No. 5,259,065, issued November 1993, which is a continuation of application Ser. No. 07/610,113, filed Nov. 7, 1990, abandoned.

FIELD OF THE INVENTION

The present invention relates to a data processing system according to the concept of a neural network.

PRIOR ART

The neural network according to the data processing system of this type is constructed with layers comprising neuron model 1(hereinafter called neurons) in parallel as shown in FIG. 2. According to neuron 1, data O is output in accordance with a comparison result between the sum of multiplied input data I1, I2, I3 . . . In input from outside by weights W1, W2, W3 . . . Wn and threshold $\theta$.

Various comparison means are applicable. For example, when a normalization function 1 [f] is applied, output data O is expressed by:

$$O = 1[\Sigma W_n \cdot I_n - \theta] \ldots \quad (1)$$

Here, when $\Sigma W_n \cdot I_n$ exceeds threshold $\theta$, O becomes "1" and when $\Sigma W_n \cdot I_n$ is smaller than threshold $\theta$, O becomes "0".

The conventional neural network is constructed by forming the neural layers with such neurons in parallel as well as the above neural layers in series. Neurons are connected with other neurons in the other neural layer according to the neural network disclosed by, for example, "IJCNN INTERNATIONAL JOINT CONFERENCE ON NEURAL NETWORK; APPLICATIONS I, ORAL PRESENTATIONS; I- pages 401 to 405 (published in 1989)".

SUMMARY OF THE INVENTION

According to the neural network reported at the above literature, although each of neurons is certainly connected with each of the other neurons, it is not clear what kind of control is performed by such connection structure of neurons. Also, the organic connection structure of the neural network has not been disclosed yet.

The present invention has an object to provide an organic connection structure of a neuron.

A data processing system according to the present invention is characterized in that output data is connected by the inhibitory connection between a plurality of neurons prepared in a neural layer, which obtains output data after the performance of the predetermined processing onto an input data, and neurons in the other neural layer.

BRIEF DESCRIPTION OF THE DRAWINGS

FIG. 7 shows a construction diagram of the 5th embodiment;

FIG. 8 shows a construction diagram of the 6th embodiment.

1, 11 to 104 . . . Neuron
10 . . . Neural Layer

PREFERRED EMBODIMENT OF THE PRESENT INVENTION

Hereinafter, the present invention is described by the embodiments with reference to the attached drawings.

Figure 1:
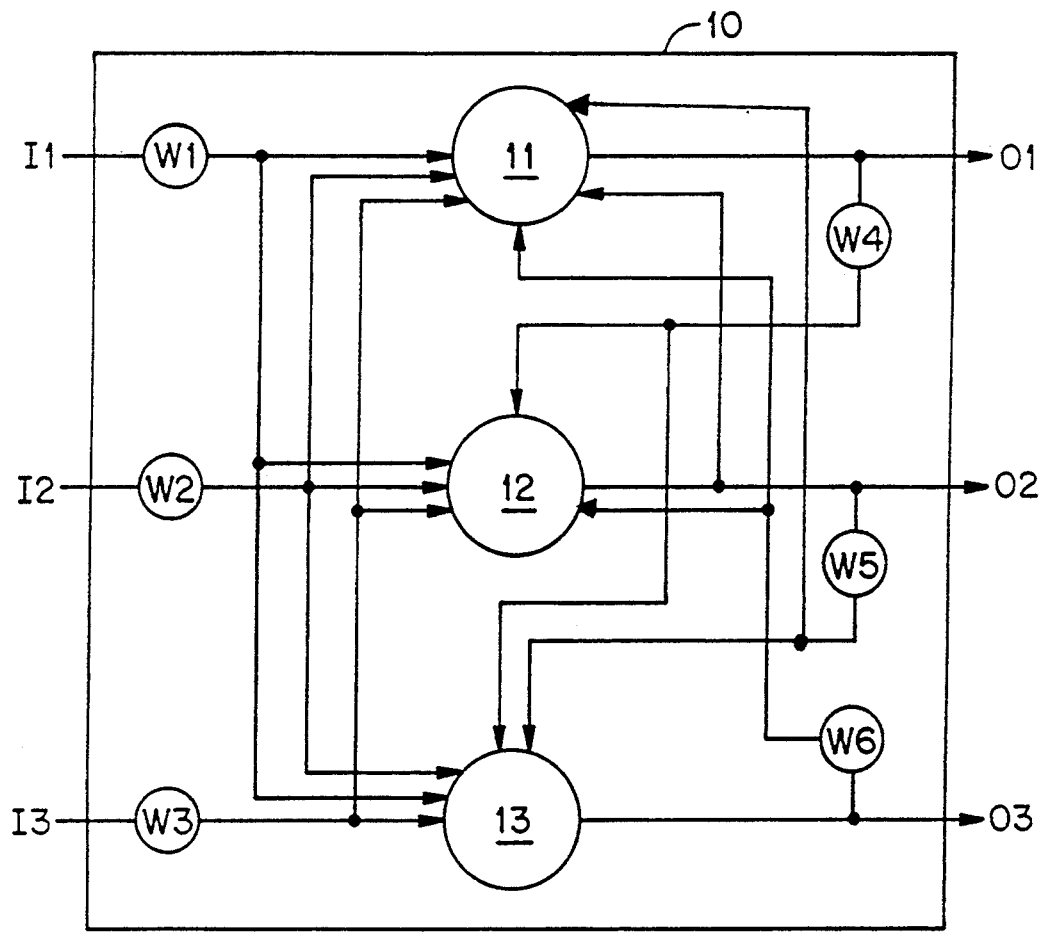
FIG. 1 shows a construction diagram of the 1st embodiment according to the present invention.
Figure 2:
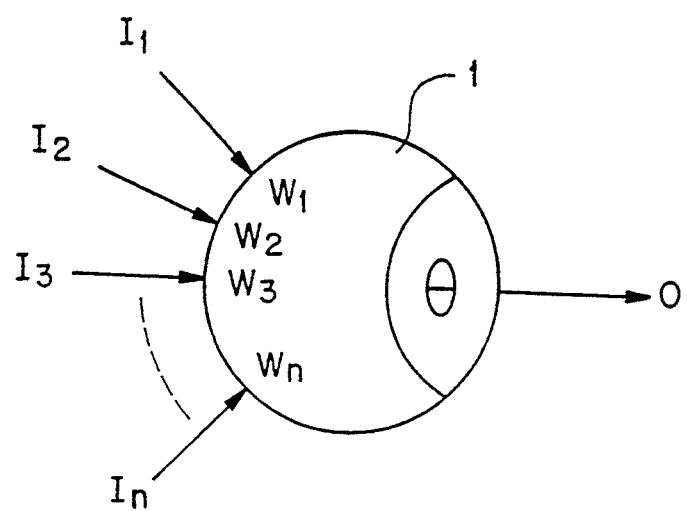
FIG. 2 shows a schematic diagram of an example of a neuron.

FIG. 1 shows a part of a neural network included in a data processing system according to the 1st embodiment of the present invention. This neural network is provided as a part of the hardware of a computer, in which each of neurons 11, 12 and 13, is for example, embodied by an operational amplifier. Weight Wn to be multiplied to each input data of each neuron is, for example, given by a variable resistance connected to the input terminal of the operational amplifier. A threshold function is realized by, for example, a switching element. A learning control is performed by changing the weight Wn and the output data is corrected by changing the variable resistance with respect to the output data of each neuron.

Three neurons 11, 12 and 13 are prepared in parallel to one another within a neural layer 10 according to the present example. Data I1, I2 and I3 are input to each neuron, from neurons of an other neural layer (not shown). Then each neuron 11, 12, 13 outputs data O1, O2, O3, respectively, after the processing in accordance with the above formula (1). An external control system not shown in the figure, performs learning control by changing weight Wn of each neuron interconnection in accordance with the above output data O1, O2 and O3.

Each neuron is connected to the other neurons, respectively. That is, output data O1 of neuron 11 is input to neurons 12 and 13, and output data O2 and O3 of neurons 12 and 13 are input to the other neurons, respectively, as output data 01. According to each neuron, weights W1, W2 and W3 with respect to input data I1, I2 and I3 from a neuron of the previous neural layer become a positive value, whereas weights W4, W5 and W6 with respect to input data O1, O2 and O3 from other neurons of the same neural layer 10 become a negative value. According to the present embodiment, connections among neurons 11, 12 and 13 are of the inhibitory type, whereas connections among neurons of other neural layers are stimulation type.

The relationship among input data, weight and output data of a neuron is described referring to the neuron 11. Output data O1 is expressed as follows in accordance with above formula (1):

$$O_1 = 1[(W_1I_1 + W_2I_2 + W_3I_3 + W_5O_2 + W_6O_3) - \theta] \quad (2)$$

Here, W1, W2 and W3 take positive values so that neuron 11 will be likely to output "1" when input data I1, I2 and I3 are "1"; in other words, it will be likely to ignite. On the other hand, since W5 and W6 take the negative value, neuron 11 becomes harder to ignite when "1" is input from neuron 12 and 13.

Figure 3:
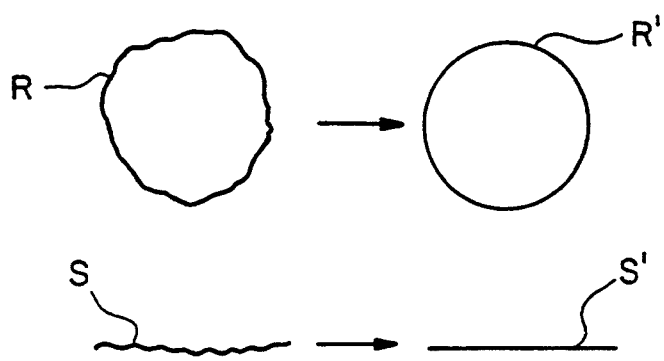
FIG. 3 shows the transformed circle and straight line and corrected circle and straight line.

According to the above, when neurons provided in the same neural layer are connected in an inhibitory manner with one another, transformed straight line S or circle R with zigzag appearance affected by noise, for example, as shown in FIG. 3 will become simply recognized, as a straight line S' or circle R' as it is described later.

Figure 4:
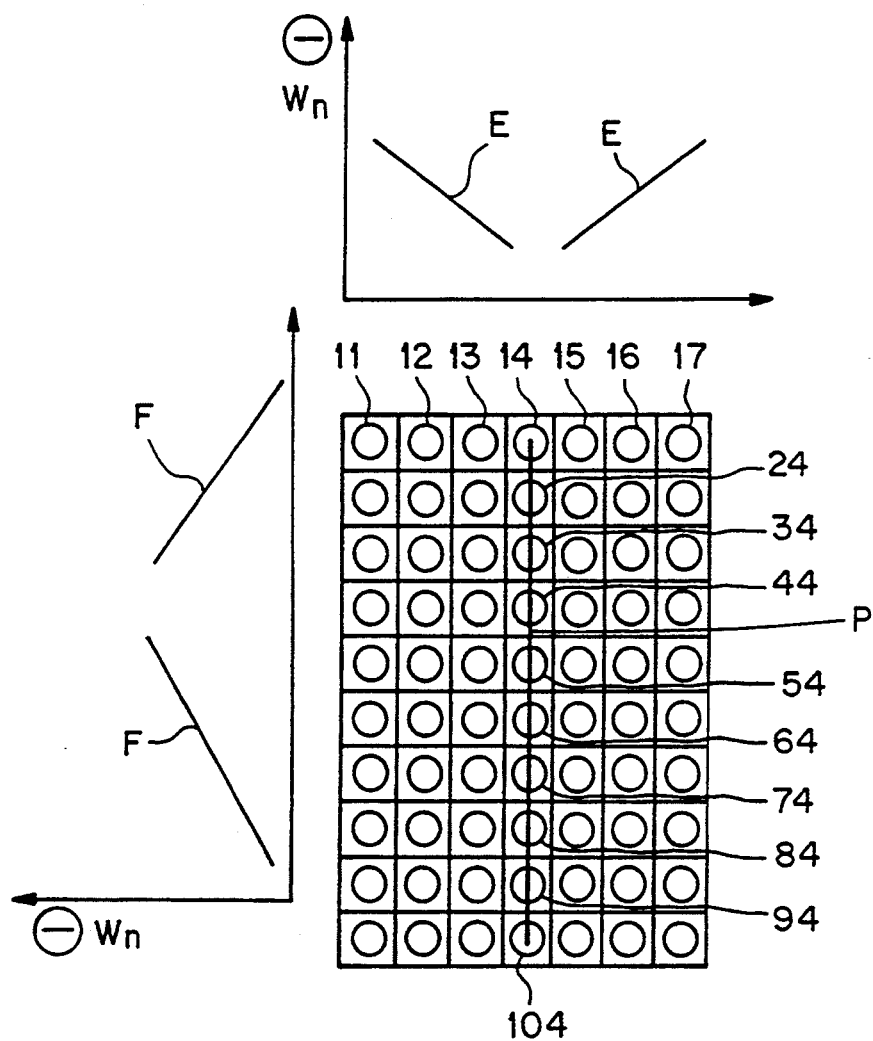
FIG. 4 shows a construction diagram of the 2nd embodiment.

FIG. 4 shows one neural layer in a neural network for recognizing both end points of a line. Here, an image consisting of 10 pixels in the vertical direction and 7 pixels in the horizontal direction is processed for easy understanding. It is assumed that one neuron corresponds to one pixel for simplification. Also, it is assumed that each neuron ignites ("1" is output) when a part of the line P (shown by a black line in FIG. 4) is recognized. The above line P is recognized by neurons in the vertical direction at the center. Therefore, when this line P is taken by a video camera, for example, it is necessary to adjust the video camera so that the line P will be located at the center of an image.

Among the neurons 11 to 17 aligned in the horizontal direction, the input of central neuron 14 is connected with the output of other neurons 11 to 13 and 15 to 17. These are the negative connections; i.e., the inhibitory type connections. Here, all neurons (11 to 13 and 15 to 17) except the central neuron are not connected with one another. According to the central neuron 14, the absolute value of weight Wn (negative value) with respect to input data from the other neurons are determined to become larger in accordance with input data of further located neuron as indicated by reference E which shows the weight Wn.

Therefore, central neuron 14 becomes hard to ignite due to the inhibition when a neuron other than the central neuron recognizes a black pixel and ignites. On the other hand, when only central neuron 14 recognizes a black pixel, this neuron 14 easily ignites. As a result, when a configuration other than a straight line is projected, the output pattern becomes random so as not to generate an effective output. Therefore, a straight line recognition at the latter neural layer becomes easier since an effective output occurs with respect only to a straight line. However, an accurate line may not be obtained by only the above processing since the possibility of the ignition of a neuron is high when a black pixel exists adjacent to the center (for example, the location corresponding to that of neuron 13). According to the present embodiment, both end points of the line are extracted first, so as to obtain an accurate line by connecting the above end points as it is described hereinafter.

Accordingly, vertically-aligned neurons 14 to 104 at the center are connected with one another. According to the above neurons, the absolute value of weight Wn (negative value) with respect to the input data from the other neurons are determined to become larger in accordance with the input data of the further located neuron. Reference F in FIG. 4 shows the weight Wn distribution with respect to a central neuron 54. The absolute value of the weight becomes smaller rectilinearly as it closes to the neurons 14 and 104 at both ends. Therefore, the more igniting neurons exist adjacent to a neuron, the harder the neuron ignites. Contrary to the above, each neuron is hard to be influenced by neurons that are distant. As a result, neurons 14 and 104 at the location corresponding to both end points of a line become easy to be ignited, and central neuron 54 becomes hard to be ignited. Therefore, both end points are remained as the end points.

Accordingly, it is possible to obtain an expected line by connecting the above 2 points at the following neural layer.

Figure 5:
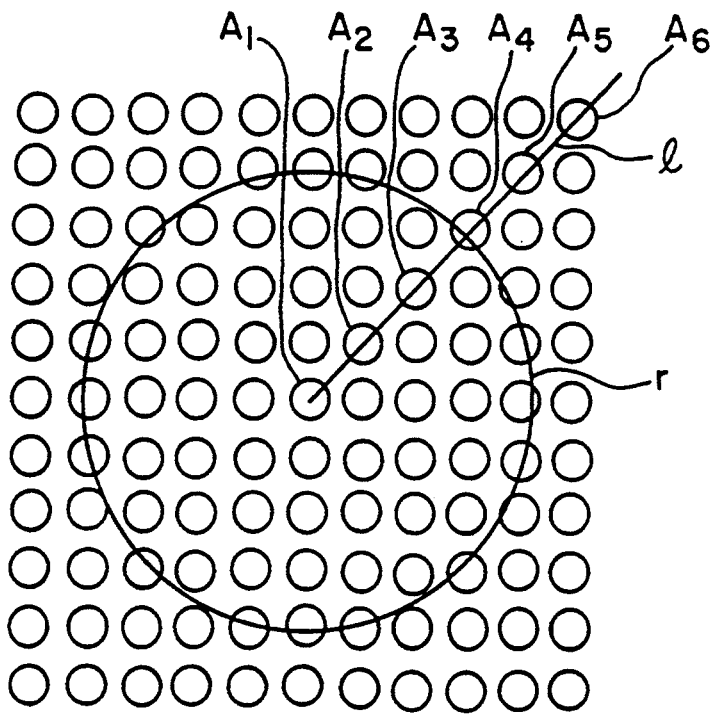
FIG. 5 shows a construction diagram of the 3rd embodiment.

FIG. 5 shows an example of the neural layer for the recognition of a circle. According to the present example, a configuration is projected on the neural layer as its center becomes a neuron A1 locating at almost the center of the neural layer.

In these neural layers except the above neural layer, a group of neurons on the same circumference centering on A1, for example, a group of neurons on the circumference of a circle r are connected in a feed back manner of a stimulation type with one another, so as to enhance the characteristics of a circle when a configuration resembling to a circle is projected. As to a group of neurons in the radial direction with its origin at A1, for example, a group of neurons on a straight line 1 are connected in a feed back manner of an inhibitory type with one another, and an absolute values of their negative weights are set up to increase in proportion to the distances between them. That is, the negative weight of neuron A3 for A1 and A5 is greater than that of for A2 and A4. According to the above, when a configuration other than a circle is projected, a large area is deleted by outputs of configuration pixels with one another. Therefore, a significant output will not be obtained.

The recognition of a circle becomes easy due to the above enhancement of a circle and an effect of the attenuation of a configuration for other configurations.

Figure 6:
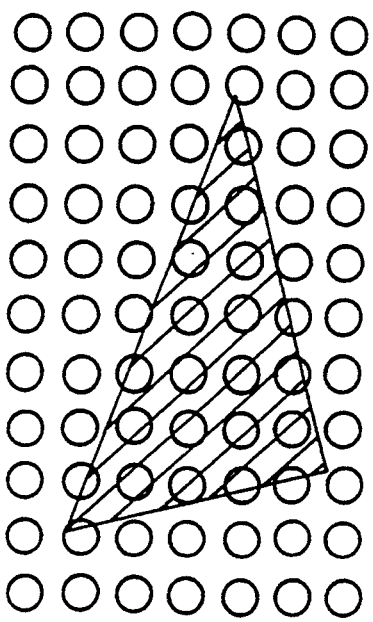
FIG. 6 shows a construction diagram of the 4th embodiment.

FIG. 6 shows a structural example of the neural layer for the extraction of the apexes of a polygon. Each neuron is connected with all neurons of the other neural layer in inhibitory type. The absolute values of the negative weights for neurons with respect to one neuron become bigger as they are positioned nearer to the above one neuron. Therefore, with respect to a triangle, for example, neurons at outside of the triangle never ignite, and the closer the neurons inside a triangle to an apex are, the more easily the neurons ignite.

FIG. 7 shows the neural network comprising 3 neural cells L, M and N by dividing neurons 11 to 16 included in a neural layer into 3. The present example shows a simplified structure of two neurons for one neural cell. Each neuron is connected with neurons of the same neural cell. It is not connected with neurons of the other neural cell. The selection between the inhibitory type connection and the stimulation type connection is possible according to the object.

FIG. 8 shows the structure that neurons of one neural layer are divided into neural cells L, M and N. According to the present embodiment, each neural cell is connected with each other. Neurons of each neural cell are not connected with one another. As to the connection among neural cells, the selection between inhibitory type and the stimulation type is possible according to the object.

In the neural network consisting of such neural cells described in FIG. 7 and FIG. 8, each neural cell comprises the structure for recognizing, for example, a triangle, a rectangle and a pentagon, respectively. When data for a rectangle is input to a neural cell which recognizes a triangle, an unreasonable result, such as "3.5 apexes exist", is output. Therefore, an accurate configuration recognition becomes possible by total judgment of the output data from each neural cell.

According to the present invention, as mentioned above, it is possible to recognize a transformed configuration with different appearance from the original shape by modifying it into the accurate configuration so as to obtain an organic connection structure among neurons with respect to the neural layer.

What is claimed is:

1. A data processing system of a neural network type, comprising a plurality of neural layers including a plurality of neurons in each said neural layer, said neural layers interconnected with a non-inhibitory connection between closer layers that monotonically decreases its inhibitory effects as the layers get closer, and with an inhibitory connection between more distant layers that monotonically increases its inhibitory effect as the distance increases, said layers connected such that a neuron firing in an inhibitory area thereof makes it less likely for a neuron in a non-inhibitory area to fire.

2. A system as in claim 1 wherein said neural layers are connected in a way to recognize a predetermined shape, said inhibitory area being areas outside said predetermined shape and said non-inhibitory area being areas inside said predetermined shape.

3. A system as in claim 1 wherein said neural layers are connected in a way to recognize a straight line, said inhibitory area being areas outside said straight line and said non-inhibitory area being areas inside said straight line.

4. A system as in claim 1 wherein said neural layers are connected in a way to recognize a circle, said inhibitory area being areas outside said circle and said non-inhibitory area being areas inside said circle.

5. A system as in claim 1 wherein said neural layers are connected in a way to recognize a polygon, said inhibitory area being areas outside said polygon and said non-inhibitory area includes apexes of the polygon.

6. A system as in claim 1 wherein each neuron is associated with a part of an image and receives a value indicative of said part, each neural layer including means for producing an output that depends on a weight of neurons thereof and a value of neurons thereof, wherein the weighing of neurons in said inhibitory area is negative and a weighing of neurons in said non-inhibitory area is positive.

7. A data processing system of a neural network type, comprising a plurality of neural layers including a plurality of neurons in each said neural layer, said neural layers interconnected with a non-inhibitory connection between closer layers that decreases its inhibitory effects as the layers get closer and never increases as the layers get closer, and with an inhibitory connection between more distant layers that increases its inhibitory effect as the distance increases and never decreases as the distance increases, said layers connected such that a neuron firing in an inhibitory area thereof makes it less likely for a neuron in a non-inhibitory area to fire.

8. A system as in claim 7 wherein said neural layers are connected in a way to recognize a predetermined shape, said inhibitory area being areas outside said predetermined shape and said non-inhibitory area being areas inside said predetermined shape.

9. A system as in claim 7 wherein said neural layers are connected in a way to recognize a straight line, said inhibitory area being areas outside said straight line and said non-inhibitory area being areas inside said straight line.

10. A system as in claim 7 wherein said neural layers are connected in a way to recognize a circle, said inhibitory area being areas outside said circle and said non-inhibitory area being areas inside said circle.

11. A system as in claim 7 wherein said neural layers are connected in a way to recognize a polygon, said inhibitory area being areas outside said polygon and said non-inhibitory area includes apexes of the polygon.

12. A system as in claim 7 wherein each neuron is associated with a part of an image and receives a value indicative of said part, each neural layer including means for producing an output that depends on a weight of neurons thereof and a value of neurons thereof, wherein the weighing of neurons in said inhibitory area is negative and a weighing of neurons in said non-inhibitory area is positive.

* * * * *